United States Patent
Wang et al.

(10) Patent No.: US 9,900,922 B2
(45) Date of Patent: Feb. 20, 2018

(54) MULTIBAND WIRELESS COMMUNICATION METHOD, COORDINATING DEVICE, AND NETWORK

(71) Applicant: ZTE CORPORATION, Shenzhen, Guangdong Province (CN)

(72) Inventors: Qian Wang, Shenzhen (CN); Lin Chen, Shenzhen (CN); Zhong Yu, Shenzhen (CN); Yang Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 97 days.

(21) Appl. No.: 14/903,487

(22) PCT Filed: Sep. 3, 2013

(86) PCT No.: PCT/CN2013/082863
§ 371 (c)(1),
(2) Date: Jan. 7, 2016

(87) PCT Pub. No.: WO2014/166201
PCT Pub. Date: Oct. 16, 2014

(65) Prior Publication Data
US 2016/0150581 A1    May 26, 2016

(30) Foreign Application Priority Data
Jul. 9, 2013  (CN) .......................... 2013 1 0286673

(51) Int. Cl.
*H04B 7/14*      (2006.01)
*H04W 76/02*  (2009.01)
(Continued)

(52) U.S. Cl.
CPC ......... *H04W 76/023* (2013.01); *H04W 16/26* (2013.01); *H04W 84/12* (2013.01); *H04W 88/10* (2013.01)

(58) Field of Classification Search
CPC ... H04W 16/26; H04W 76/023; H04W 88/10; H04W 84/12
See application file for complete search history.

(56) References Cited

U.S. PATENT DOCUMENTS

2006/0111047 A1* 5/2006 Louberg ................ H04W 92/20
                                                            455/41.2
2006/0126562 A1   6/2006 Liu
(Continued)

FOREIGN PATENT DOCUMENTS

CN     101272296 A     9/2008
CN     102307143 A     1/2012

OTHER PUBLICATIONS

International Search and Written Opinion dated Apr. 3, 2014 in PCT/CN2013/082863.

*Primary Examiner* — Ayaz Sheikh
*Assistant Examiner* — Hai-Chang Hsiung
(74) *Attorney, Agent, or Firm* — Plumsea Law Group, LLC

(57) ABSTRACT

Disclosed are a multi-band wireless communication method, a coordinating device and a network, wherein the method is applied to a coordinating device that supports multi-band communication, wherein the coordinating device manages a node resource information table, and the node resource information table includes terminal information of a subnet where the coordinating device is located and other subnets; the method includes: the coordinating device receiving a link establishment request; the coordinating device responding to the link establishment request according to the node resource information table, instructing transmitting and receiving ends to establish a point-to-point connection or coordinating to establish relay links between the transmitting and receiving ends; and receiving and forwarding
(Continued)

| Identification information | Supported band |
|---|---|
| Identification information of terminal device A | Wi-Fi |
| Identification information of terminal device B | Wi-Fi/60GHz |
| Identification information of terminal device C | 60GHz |
| ... | ... | received data packets when the coordinating device is a relay node.

15 Claims, 5 Drawing Sheets

(51) Int. Cl.
  *H04W 16/26* (2009.01)
  *H04W 84/12* (2009.01)
  *H04W 88/10* (2009.01)

(56) References Cited

U.S. PATENT DOCUMENTS

| | | | | |
|---|---|---|---|---|
| 2008/0250478 | A1* | 10/2008 | Miller | H04L 9/32 726/5 |
| 2009/0135823 | A1* | 5/2009 | Liu | H04L 45/00 370/392 |
| 2011/0158173 | A1* | 6/2011 | Cucala Garcia | H04W 24/02 370/328 |
| 2012/0113989 | A1* | 5/2012 | Akiyoshi | H04L 45/02 370/392 |

\* cited by examiner

MULTIBAND WIRELESS COMMUNICATION METHOD, COORDINATING DEVICE, AND NETWORK

CROSS-REFERENCE TO RELATED APPLICATION(S)

This application is the U.S. National Phase application of PCT application number PCT/CN2013/082863 having a PCT filing date of Sep. 03, 2013, which claims priority of Chinese patent application 201310286673.3 filed on Jul. 09, 2013, the disclosures of which are hereby incorporated by reference.

TECHNICAL FIELD

The present document relates to the field of wireless communications, and more particularly, to a multi-band wireless communication method, a coordinating device and a network.

BACKGROUND OF THE INVENTION

WiFi (Wireless Fidelity) wireless communication technology is a technology that short-range terminals such as personal computers, handheld devices (such as tablets, mobile phones) are networked in the wireless mode, and the WiFi technology standard is developed by the ISO Institute of Electrical and Electronics Engineers (IEEE) 802.11 Working Group, and its communications bands are mainly 2.4 GHz and 5 GHz. Currently, the WiFi device has almost become the standard configuration component of a terminal device, however, with the popularity of high-definition video technology and the development of high-speed and large amount of data communication technology, the relatively low transfer rate of a simple WiFi network cannot meet the demands of practical applications.

With the continuous maturity of device manufacturing level and technology, the civil 60 GHz wireless communication technology has emerged, the advantage of the 60 GHz technology is large transmission bandwidth and it is up to Gigabit-order of transfer rate, but its transmission beam is narrow and its penetration is poor, therefore the antennas array and beam forming technology are generally used to make the beams propagate along the line of sight in a specified direction or along the reflection path and around obstacles to reach the receiving end. At the current stage, the 60 GHz technology standard formulating work is being accelerated, there are multiple standards organizations developing their own 60 GHz communication technical specifications, such as IEEE802.11ad, IEEE802.15.3c and European Computer Manufacturers Association (ECMA)-387.

Unlike the 60 GHz technology, the WiFi technology can penetrate obstacles and implement a point-to-multipoint broadcast communication, and the current WiFi Direct standard released by the WiFi Alliance also allows wireless devices to communicate with each other without going through routers. Thus, the conventional low-band WiFi technology (the WiFi involved in the following refers to the 2.4 GHz and/or 5 GHz working bands) and the 60 GHz technology can form effective complementary to mixedly network the communication devices that support both of the technologies, they coordinate and establish a multi-band communication link to meet more diverse communication needs. Currently, there have been some technologies attempting to integrate communication modules of multiple bands for the same terminal, to meet the communication compatibility needs, although this can achieve wireless communication between the various types of terminals within a network, the drawback is that a plurality of communication modules are integrated in the terminal device in the network, the cost is relatively high, and the coordination among the multiple modules also increases the load on the terminal device.

SUMMARY

The embodiment of the present document further provides a multi-band wireless communication method, a coordinating device and a network, to solve the technical problem that multi-band communication has too high requirements on terminals.

The embodiment of the present document provides a multi-band wireless communication method to be applied to a coordinating device that supports multi-band communication, wherein the coordinating device manages a node resource information table, and the node resource information table comprises terminal information of a subnet where the coordinating device is located and other subnets; the method comprises:

the coordinating device receiving a link establishment request;

the coordinating device responding to the link establishment request based on the resource information table, instructing a transmitting end and a receiving end to establish a point-to-point connection or coordinating to establish relay links between the transmitting end and the receiving end; and when the coordinating device is a relay node, the coordinating device receiving and forwarding received data packets.

Alternatively, the terminal information comprises identification information used for identifying a terminal and a subnet where the terminal is located; the link establishment request comprises identification information of the transmitting end and the receiving end;

the coordinating device responding to the link establishment request comprises:

if the transmitting end is located in the subnet where the transmitting end is located or the link establishment request comes from a coordinating device in the subnet where the transmitting end is located, the coordinating device responding to the link establishment request.

Alternatively, the relay links that the coordinating device coordinates to establish between the transmitting end and the receiving end comprise:

a forward relay link from the coordinating device to the transmitting end as well as a backward relay link from the coordinating device to the receiving end; or, a forward relay link from the coordinating device to the transmitting end as well as a backward relay link from the coordinating device to a coordinating device connecting with the receiving end; or, a forward relay link from the coordinating device to a coordinating device connecting with the transmitting end as well as a backward relay link from the coordinating device to the receiving end.

Alternatively, the coordinating device receiving and forwarding received data packets comprises:

when bands of the forward relay link and the backward relay link of the coordinating device are different, the coordinating device converting and then forwarding the received data packets.

Alternatively, the terminal information further comprises band information supported by the terminal; the link establishment request further comprises requested band information;

the coordinating device receiving and forwarding the received data packets comprises:

when the requested band information is not compatible with the band information supported by the receiving end, the coordinating device in the subnet where the transmitting end is located or the coordinating device in the subnet where the receiving end is located converting and then forwarding the received data packets.

Alternatively, the terminal information further comprises band information supported by the terminal; the link establishment request further comprises requested band information; the coordinating device supports two bands: WiFi and 60 GHz;

when the requested band information is 60 GHz, the coordinating device responding to the link establishment request based on the node resource information table comprises:

the coordinating device judging compatibility between the band information supported by the receiving end and the requested band information based on the node resource information table;

if not compatible, the coordinating device establishing a first relay link to the transmitting end and a second relay link to the receiving end;

if compatible, the coordinating device judging whether the transmitting end and the receiving end are located in a same subnet;

if located in the same subnet, the coordinating device instructing the transmitting end and the receiving end to establish a point-to-point connection; if located in different subnets, the coordinating device in the subnet where the transmitting end is located forwarding the link establishment request to the coordinating device in the subnet where the receiving end is located, and the coordinating device in the subnet where the transmitting end is located establishing a first relay link to the transmitting end, the coordinating device in the subnet where the receiving end is located establishing a second relay link to the receiving end, and the coordinating device in the subnet where the transmitting end is located establishing a third relay link to the coordinating device in the subnet where the receiving end is located.

Alternatively, the terminal information further comprises band information supported by the terminal; the link establishment request further comprises requested band information; the coordinating device supports two bands: WiFi and 60 GHz;

when the requested band information is WiFi, the coordinating device responding to the link establishment request based on the node resource information table comprises:

the coordinating device judging compatibility between the band information supported by the receiving end and the requested band information based on the node resource information table;

if compatible, the coordinating device establishing a first relay link to the transmitting end and a second relay link to the receiving end, or instructing the transmitting end and the receiving end to establish a point-to-point connection;

if not compatible, judging whether the transmitting end and the receiving end are located in a same subnet;

if located in the same subnet, the coordinating device establishing a first relay link to the transmitting end and a second relay link to the receiving end; if located in different subnets, the coordinating device in the subnet where the transmitting end is located forwarding the link establishment request to the coordinating device in the subnet where the receiving end is located, and the coordinating device in the subnet where the receiving end is located establishing a first relay link to the transmitting end as well a second relay link to the receiving end.

Alternatively, the terminal information further comprises point-to-point capability information;

the coordinating device instructing the transmitting end and the receiving end to establish a point-to-point connection comprises:

when the band information supported by the receiving end is compatible with the requested band information and both the transmitting end and the receiving end have the point to point capability, the coordinating device instructing the transmitting and receiving ends to establish the point-to-point connection.

The embodiment of the present document further provides a coordinating device that supports multi-band communication, comprising:

an information managing unit, which is configured to: manage a node resource information table, wherein the node resource information table comprises terminal information of a subnet where the coordinating device is located as well as other subnets;

a request receiving unit, configured to: receive a link establishment request;

a request responding unit, configured to: respond to the link establishment request based on the resource information table, instruct a transmitting end and a receiving end to establish a point-to-point connection or coordinate to establish relay links between the transmitting end and the receiving end; and a packet forwarding unit, configured to: when the coordinating device is a relay node, receive and forward received data packets.

Alternatively, the terminal information comprises identification information used for identifying a terminal and a subnet where the terminal is located; the link establishment request comprises identification information of the transmitting end and identification information of the receiving end;

the request responding unit is configured to respond to the link establishment request in the following manner:

if the transmitting end is located in the subnet where the transmitting end is located or the link establishment request comes from a coordinating device in the subnet where the transmitting end is located, responding to the link establishment request.

Alternatively, the relay links that the request responding unit coordinates to establish between the transmitting end and the receiving end comprise:

a forward relay link from the coordinating device to the transmitting end as well as a backward relay link from the coordinating device to the receiving end; or, a forward relay link from the coordinating device to the transmitting end as well as a backward relay link from the coordinating device to a coordinating device connecting with the receiving end; or, a forward relay link from the coordinating device to a coordinating device connecting with the transmitting end as well as a backward relay link from the coordinating device to the receiving end.

Alternatively, the packet forwarding unit is configured to receive and forward the received data packets in the following manner:

when bands of the forward relay link and the backward relay link of the coordinating device are different, converting and then forwarding the received data packets.

Alternatively, the terminal information further comprises band information supported by the terminal; the link establishment request further comprises requested band information;

the packet forwarding unit is configured to receive and forward the received data packets in the following manner:

when the requested band information is not compatible with the band information supported by the receiving end, and the coordinating device works as a coordinating device in the subnet where the transmitting end is located or a coordinating device in the subnet where the receiving end is located, converting and then forwarding the received data packets.

Alternatively, the terminal information further comprises band information supported by the terminal; the link establishment request further comprises requested band information; the coordinating device supports two bands: WiFi and 60 GHz;

the request responding unit comprises:

a compatibility judging unit, configured to: judge compatibility between the band information supported by the receiving end and the requested band information based on the node resource information table;

a cross-subnet judging unit, configured to: when the requested band information is 60 GHz and when judged as compatible, or when the requested band information is WiFi and when judged as not compatible, judge whether the transmitting end and the receiving end are located in a same subnet;

a request forwarding unit, configured to: when the coordinating device works as a coordinating device in the subnet where the transmitting end is located and the requested band information is 60 GHz and when judged as cross-subnet, or when the requested band information is WiFi and when judged as cross-subnet, forward the link establishment request to the coordinating device in the subnet where the receiving end is located; and a link establishing unit, configured to: instruct the transmitting end and the receiving end to establish a point-to-point connection or relay links;

wherein, the link establishing unit is configured to instruct the transmitting end and the receiving end to establish a point-to-point connection or relay links in the following manner:

when the requested band information is 60 GHz and when judged as not compatible, or when the requested band information is WiFi and when judged as compatible, or when the requested band information is WiFi and when judged as being in the same subnet, establishing a first relay link to the transmitting end and a second relay link to the receiving end;

when the requested band information is 60 GHz and when judged as being in the same subnet, or when the requested band information is WiFi and when judged as compatible, instructing the transmitting end and the receiving end to establish a point-to-point connection;

when the requested band information is 60 GHz and when judged as cross-subnet, if the coordinating device works as a coordinating device in the subnet where the transmitting end is located, establishing a first relay link to the transmitting end as well as a third relay link to the coordinating device in the subnet where the receiving end is located; if the coordinating device works as a coordinating device in the subnet where the receiving end is located, establishing a second relay link to the receiving end and a third relay link to the coordinating device in the subnet where the transmitting end is located;

when the requested band information is WiFi and when judged as cross-subnet, if the coordinating device works as a coordinating device in the subnet where the receiving end is located, establishing a first relay link to the transmitting end as well as a second relay link to the receiving end.

Alternatively, the terminal information further comprises point-to-point capability information;

the link establishing unit is configured to instruct the transmitting end and the receiving end to establish a point-to-point connection in the following manner:

when the band information supported by the receiving end is compatible with the requested band information and both the transmitting end and the receiving end have the point-to-point capability, instructing the transmitting end and the receiving end to establish the point-to-point connection.

The embodiment of the present document further provides a multi-band wireless communication network, comprising at least two subnets, wherein each subnet comprises:

the abovementioned coordinating device, which is configured to: support communication in at least two bands; and at least two terminals, wherein, each of the terminals supports communication in at least one band.

Through the multi-band wireless communication network, coordinating device and communication method according to the embodiment of the present document, using a coordinating device that supports communication in at least two bands, the communication terminal is not required to have the multi-band communication capability, i.e., the coordinating device can be used to realize the multi-band mixed networking.

PREFERRED EMBODIMENTS OF THE INVENTION

Hereinafter in conjunction with the accompanying drawings, the embodiments of the present document will be described in detail. It should be noted that in the case of no conflict, embodiments and features in the embodiments of the present application may be arbitrarily combined with each other.

Figure 1:
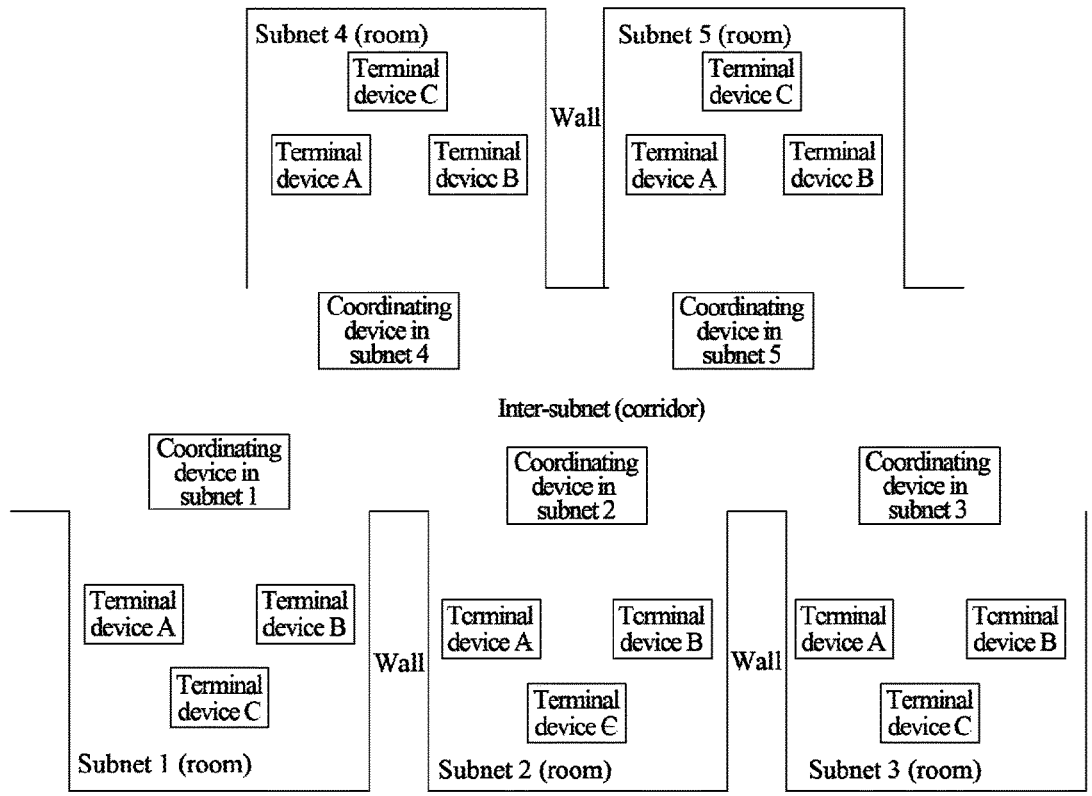
FIG. 1 is a schematic diagram of a multi-band wireless communication network in accordance with an embodiment of the present document.

A multi-band wireless communication network according to the embodiment of the present document is shown in FIG. 1, and the communication network comprises at least two subnets, FIG. 1 shows five subnets, wherein each subnet comprises:

a coordinating device, which is used to support communication in at least two bands;

at least two terminals, wherein the terminals support communications in at least one band.

FIG. 1 shows an application scenario of a short-range wireless communication network consisting of multiple rooms in a typical indoor environment, since there are wall obstructions between rooms, the 60 GHz LOS (Line Of Sight) communication cannot be performed across the rooms, and coordinating devices can be respectively installed in a central location of the corridor ceiling and at the junctions between the rooms and the corridor to establish the 60 GHz relay link.

Figure 2:
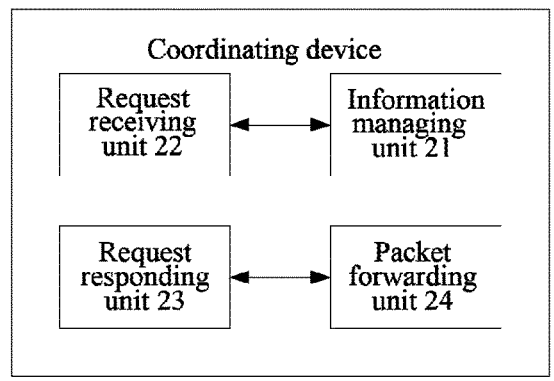
FIG. 2 is a schematic diagram of module configuration of a coordinating device in accordance with an embodiment of the present document.

In the following, the module configuration of a coordinating device in accordance with an embodiment of the present document will be illustrated, as described above, each coordinating device manages a subnet, and the coordinating device supports multi-band communication, as shown in FIG. 2, the coordinating device comprises:

An information managing unit 21, which is used to manage the node resource information table, wherein the node resource information table comprises terminal information of the subnet where the coordinating device is located as well as other subnets;

A request receiving unit 22, which is used to receive a link establishment request;

A request responding unit 23, which is used to respond to the link establishment request according to the node resource information table, and instruct a transmitting end and a receiving end to establish a point-to-point connection or coordinate to establish relay links between the transmitting end and the receiving end;
and A packet forwarding unit 24, which is used to receive and forward the received data packets when the coordinating device is a relay node.

The terminal information comprises identification information for identifying a terminal and a subnet where the terminal is located, the identification information may be a string, a part of which is used to identify the subnet where the terminal is located, and the other part of which is used to identify the terminal within the subnet, the link establishment request comprises identification information of the transmitting end and the receiving end;

the request responding unit 23 is configured to respond to the link establishment request in the following manner:

if the transmitting end is located in the subnet where it is located or the link establishment request comes from a coordinating device in the subnet where the transmitting end is located, responding to the link establishment request.

For a link establishment request to request for WiFi, due to the relatively strong WiFi signal capability, besides that the coordinating device in the subnet where the transmitting end is located can receive the link establishment request, the coordinating devices in other subnets may also receive the link establishment request, in order to simplify the processing, when a coordinating device receiving the link establishment request determines that neither the transmitting end nor the receiving end is in the subnet to which the coordinating device belongs, it does not process the link establishment request, and when the link establishment request is cross-subnet, the coordinating device in the subnet where the transmitting end is located sends a link establishment request to the coordinating device in the subnet where the receiving end is located, and the coordinating device in the subnet where the receiving end is located processes the link establishment request.

When it is unable to establish a point-to-point connection from the transmitting end to the receiving end or it is to establish a relay connection by default, the coordinating device works as a relay node, relay links that the request responding unit 23 of the coordinating device coordinates to establish between the transmitting end and the receiving end comprise:

a forward relay link from the coordinating device to the transmitting end as well as a backward relay link from the coordinating device to the receiving end; or, a forward relay link from the coordinating device to the transmitting end as well as a backward relay link from the coordinating device to a coordinating device connecting with the receiving end; or, a forward relay link from the coordinating device to a coordinating device connecting with the transmitting end as well as a backward relay link from the coordinating device to the receiving end.

Alternatively, when the bands of the forward relay link and the backward relay link of the coordinating device are different, the packet forwarding unit 24 converts and then forwards the received data packets. This makes terminals supporting different bands can communicate through the converting and forwarding functions of the coordinating device.

Figures 3, 4:
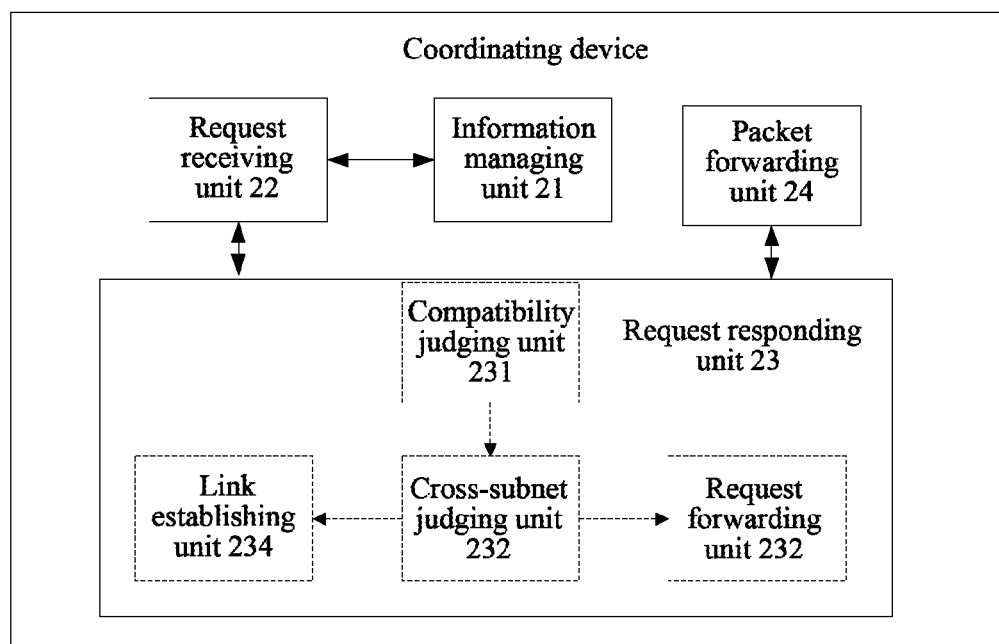
FIG. 3 is a schematic diagram of terminal information of a node resource information table.
FIG. 4 is a schematic diagram of module configuration of a coordinating device in accordance with an embodiment of the present document.

Alternatively, as shown in FIG. 3, besides the identification information, the terminal information further comprises band information supported by the terminal; the link establishment request further comprises requested band information; when the requested band information is not compatible with the band information supported by the receiving end, the coordinating device works as the coordinating device in the subnet where the transmitting end or the receiving end is located, and the packet forwarding unit 24 converts and then forwards the received data packets.

In the following, the coordinating device supporting two bands, WiFi and 60 GHz, is taken as an example to describe the function of the request responding unit 23.

In order to coordinate different types of communication requirements (WiFi communication and 60 GHz communication), the coordinating device in the network shall be simultaneously equipped with both the WiFi functional module and the 60 GHz functional module. The WiFi module and the 60 GHz module may be independently integrated into the same coordinating device, or may be integrated into the same coordinating device by means of be independent in the bottom layer and be in common in the high layer (be independent in the physical (PHY) layer, and in common in the MAC (Media Access Control) layer and above; or be independent in the PHY layer and the MAC layer, and in common in the radio link control (RLC) layer and above). The terminals in each room are not compulsively equipped with both the WiFi module and the 60 GHz module.

As shown in FIG. 3, the terminal information further comprises the band information supported by the terminal; the link establishment request further comprises the requested band information; the coordinating device supports two bands: WiFi and 60 GHz, as shown in FIG. 4, the request responding unit 23 comprises:

A compatibility judging unit 231, which is used to judge the compatibility between the band information supported by the receiving end and the requested band information based on the node resource information table;

A cross-subnet judging unit 232, which is used to judge whether the transmitting end and the receiving end are located in the same subnet when the requested band information is 60 GHz and when judged as compatible, or when the requested band information is WiFi and when judged as not compatible;

A request forwarding unit 233, which is used to forward a link establishment request to the coordinating device in the subnet where the receiving end is located when the coordinating device works as the coordinating device in the subnet where the transmitting end is located and the requested band information is 60 GHz and when judged as cross-subnet, or when the requested band information is WiFi and when judged as cross-subnet; and A link establishing unit 234, which is used to instruct the transmitting end and the receiving end to establish a point-to-point connection or relay links;

the link establishing unit is used to instruct the transmitting end and the receiving end to establish a point-to-point connection or relay links in the following manner:

when the requested band information is 60 GHz and when judged as not compatible, or when the requested band information is WiFi and when judged as not compatible, or when the requested band information is WiFi and when judged as being in the same subnet, establishing a first relay link to the transmitting end and a second relay link to the receiving end;

when the requested band information is 60 GHz and when judged as being in the same subnet, or when the requested band information is WiFi and when judged as compatible, instructing the transmitting end and the receiving end to establish a point-to-point connection;

when the requested band information is 60 GHz and when judged as cross-subnet, establishing a first relay link to the transmitting end as well as a third relay link to the coordinating device in the subnet where the receiving end is located if the coordinating device works as a coordinating device in the subnet where the transmitting end is located; establishing a second relay link to the receiving end and a third relay link to the coordinating device in the subnet where the transmitting end is located if the coordinating device works as a coordinating device in the subnet where the receiving end is located;

when the requested band information is WiFi and when judged as cross-subnet, establishing a first relay link to the transmitting end as well as a second relay link to the receiving end if the coordinating device works as a coordinating device in the subnet where the receiving end is located.

Alternatively, the terminal information further comprises the point-to-point capability information; when the receiving end is compatible with the requested band information and both the transmitting end and the receiving end have the point-to-point capability, the coordinating device instructs the transmitting end and the receiving end to establish a point-to-point connection.

The embodiment of the present document can achieve mixed networking of the WiFi band and 60 GHz band, does not require the compatibility of communication bands of the terminal, and can achieve 60 GHz communication of cross-subnet.

Figure 5:
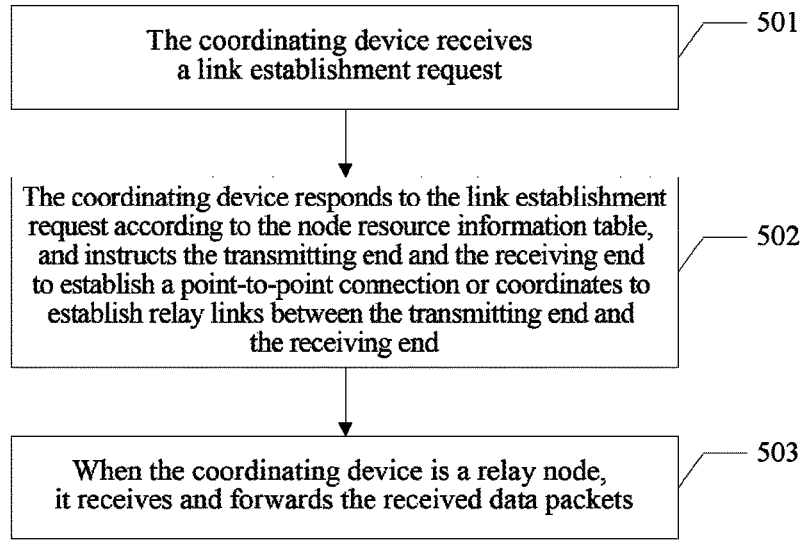
FIG. 5 is a schematic diagram of a multi-band radio communication method in accordance with an embodiment of the present document.

In the following, the multi-band radio communication method according to the embodiment of the present document will be described, the method is applied to coordinating devices supporting multi-band communication, as described above, the coordinating device manages the node resource information table, and the node resource information table comprises terminal information of the subnet where the coordinating device is located and other subnets, as shown in FIG. 5, the method comprises the following steps:

in step 501, the coordinating device receives a link establishment request.

The link establishment request received by the coordinating device may come from the transmitting end or from the coordinating device in the subnet where the transmitting end is located.

In step 502, the coordinating device responds to the link establishment request according to the node resource information table, and instructs the transmitting end and the receiving end to establish a point-to-point connection or coordinates to establish relay links between the transmitting end and the receiving end.

The terminal information comprises identification information for identifying the terminal and the subnet where the terminal is located, the link establishment request comprises the identification information of the transmitting end and the receiving end; the coordinating device responding to the link establishment request comprises:

if the transmitting end is located in the subnet where it is located, or the link establishment request comes from the coordinating device in the subnet where the transmitting end is located, the coordinating device responding to the link establishment request.

Alternatively, the relay links established between the transmitting end and the receiving end through coordinating by the coordinating devices comprises:

a forward relay link from the coordinating device to the transmitting end as well as a backward relay link from the coordinating device to the receiving end; or, a forward relay link from the coordinating device to the transmitting end as well as a backward relay link from the coordinating device to a coordinating device connecting with the receiving end; or, a forward relay link from the coordinating device to a coordinating device connecting with the transmitting end as well as a backward relay link from the coordinating device to the receiving end.

In step 503, when the coordinating device is a relay node, it receives and forwards the received data packets.

When the bands of the forward relay link and the backward relay link of the coordinating device are different, the coordinating device converts and then forwards the received data packets.

Alternatively, the terminal information further comprises the band information supported by the terminal; the link establishment request further comprises the requested band information; the coordinating device in the subnet where the transmitting end is located or the coordinating device in the subnet where the receiving end is located converts and then forwards the received data packets when the requested band information is not compatible with the band information supported by the receiving end.

The coordinating device judges whether the communication bands of both the transmitting and receiving ends are compatible by querying the node resource information table.

Figure 6:
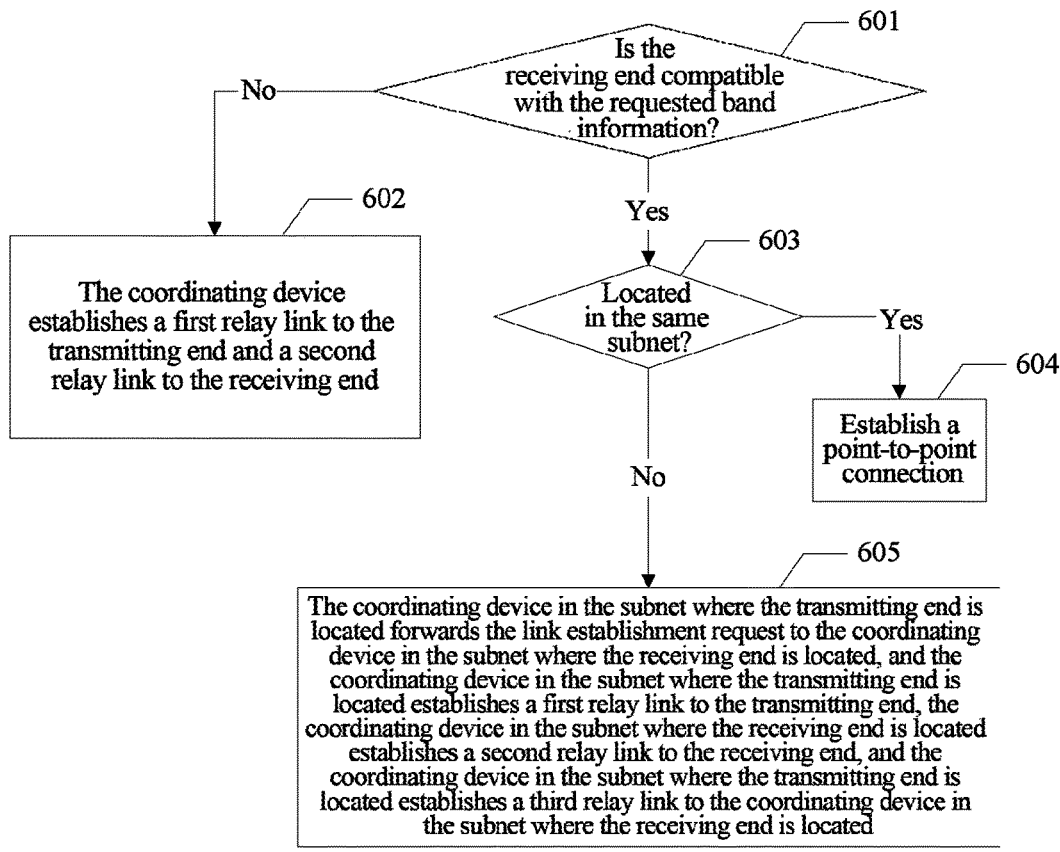
FIG. 6 and FIG. 7 are schematic diagrams of a processing procedure of a coordinating device when the requested bands are 60 GHz and WiFi in accordance with an embodiment of the present document.

The terminal information further comprises the band information supported by the terminal; the link establishment request further comprises the requested band information; in the following, the scenario in which the coordinating device supports the two bands: WiFi and 60 GHz will be described, if the requested band information is 60 GHz, as shown in FIG. 6, the coordinating device responding to the link establishment request according to the node resource information table comprises the following steps:

in step 601, the coordinating device judges the compatibility between the band information supported by the receiving end and the requested band information according to the node resource information table.

In step 602, if they are not compatible, the coordinating device establishes a first relay link to the transmitting end and a second relay link to the receiving end.

In step 603, if they are compatible, it is to judge whether the transmitting end and the receiving end are located in the same subnet.

In step 604, if they are located in the same subnet, it is to instruct the transmitting end and the receiving end to establish a point-to-point connection.

In step 605, if they are cross-subnet, the coordinating device in the subnet where the transmitting end is located forwards the link establishment request to the coordinating device in the subnet where the receiving end is located, and the coordinating device in the subnet where the transmitting end is located establishes a first relay link to the transmitting end, the coordinating device in the subnet where the receiving end is located establishes a second relay link to the receiving end, and the coordinating device in the subnet where the transmitting end is located establishes a third relay link to the coordinating device in the subnet where the receiving end is located.

Figure 7:
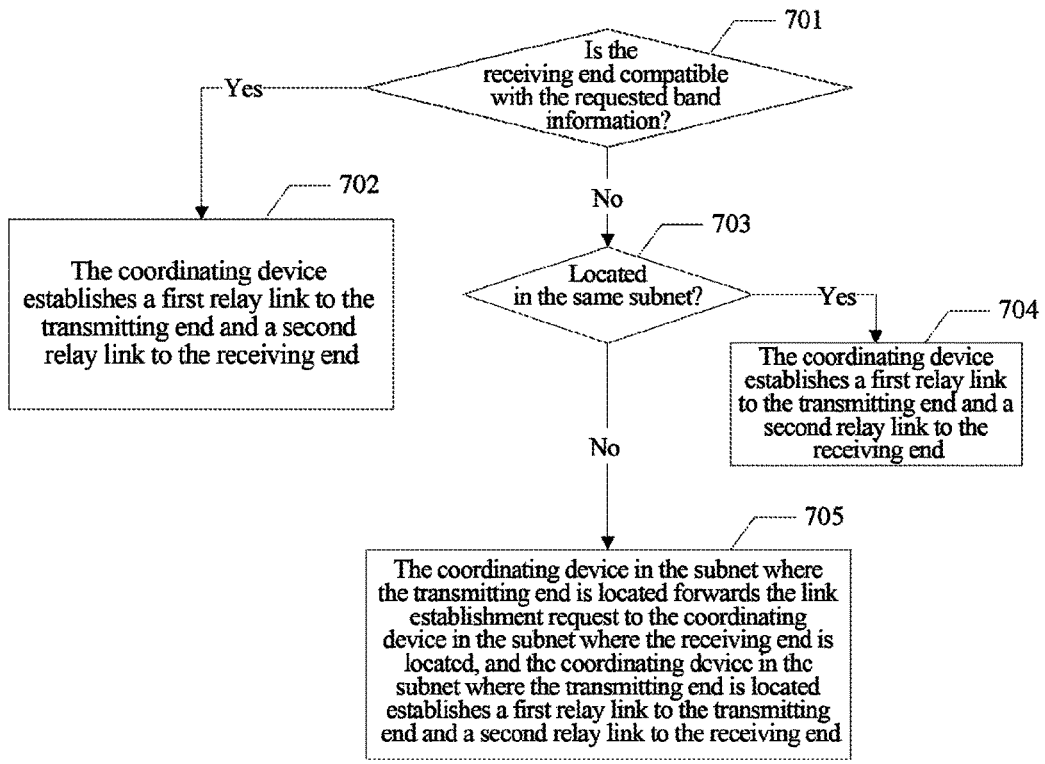

If the requested band information is WiFi, as shown in FIG. 7, the coordinating device responding to the link establishment request according to the node resource information table comprises the following steps:

in step 701, the coordinating device judges the compatibility between the band information supported by the receiving end and the requested band information according to the node resource information table.

In step 702, if they are compatible, the coordinating device establishes a first relay link to the transmitting end and a second relay link to the receiving end, or instructs the transmitting end and the receiving end to establish a point-to-point connection.

In step 703, if they are not compatible, it is to judge whether the transmitting end and the receiving end are located in the same subnet.

In step 704, if they are located in the same subnet, the coordinating device establishes a first relay link to the transmitting end and a second relay link to the receiving end.

In step 705, if they are cross-subnet, the coordinating device in the subnet where the transmitting end is located forwards a link establishment request to the coordinating device in the subnet where the receiving end is located, and the coordinating device in the subnet where the receiving end is located establishes a first relay link to the transmitting end as well as a second relay link to the receiving end.

Alternatively, the terminal information further comprises the point-to-point capability information, when the band information supported by the receiving end is compatible with the requested band information and both the transmitting end and the receiving end have the point-to-point capability, the coordinating device instructs the transmitting end and the receiving end to establish a point-to-point connection.

The multi-band wireless communication network, coordinating device and communication method in accordance with the embodiments of the present document do not require the terminal communication having the multi-band communication capability, that is, multi-band mixed networking can be achieved through coordinating devices, for example, the mixed networking of the WiFi band and the 60 GHz band is able to solve the problem of 60 GHz transmission between different subnets.

Hereinafter, in conjunction with the accompanying drawings and application examples, the method according to the embodiments of the present document will be described in detail.

APPLICATION EXAMPLE 1

Figure 8:
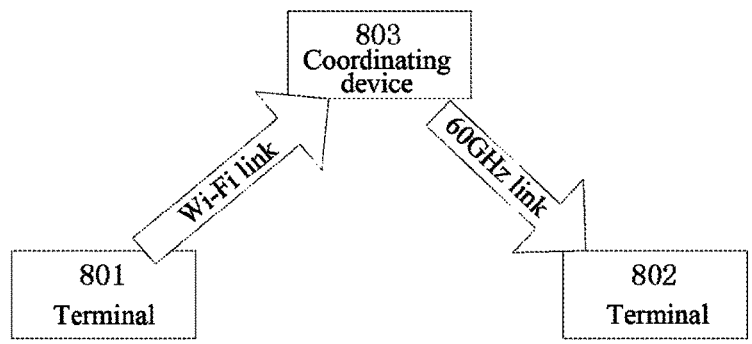
FIG. 8-FIG. 11 are schematic diagrams of a link in application examples of the present document.

In this embodiment, as shown in FIG. 8, a terminal 801 that only supports WiFi communication and a terminal 802 that only supports 60 GHz communication are in the same subnet, FIG. 8 is a schematic diagram of a link established by the terminal 801 that only supports the WiFi communication and the terminal 802 that only supports the 60 GHz communication in the same subnet, since the communications bands of the terminal 801 and the terminal 802 are not compatible, a point-to-point link cannot be established, and a coordinating device 803 is needed to coordinate to establish relay links.

The terminal transmitting end 801 transmits a link establishment request to the coordinating device 803 in the subnet where it is located, and the request comprises terminal information of the transmitting end 801 and the receiving end 802 as well as the established WiFi band link;

the coordinating device 803 judges the compatibility between the communications bands of both terminal transmitting and receiving ends according to the node resource information table;

when judged as not compatible, the coordinating device 803 instructs both the transmitting and receiving ends to establish relay links through the coordinating device 803, wherein, it establishes a WiFi relay link with the terminal transmitting end 801 and establishes a 60 GHz relay link with the terminal receiving end 802.

The transmitting end 801 and the receiving end 802 confirm the instruction, establish a communication link to communicate, wherein, because the forward relay link of the coordinating device 803 is a WiFi relay link and its backward relay link is a 60 GHz relay link, the bands are not compatible, the coordinating device 803 needs to convert and then forward the received data packets.

APPLICATION EXAMPLE 2

Figure 9:
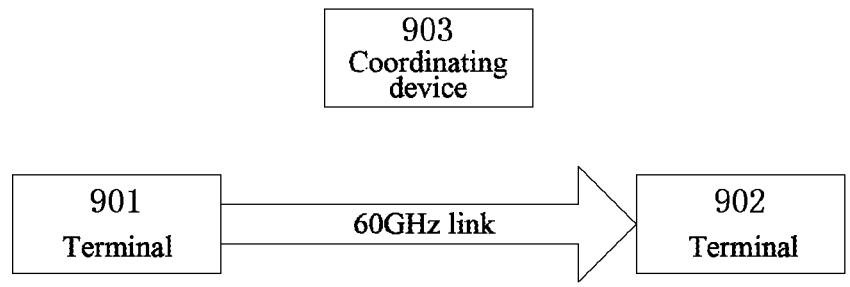

In the application example 2, as shown in FIG. 9, if the terminal transmitting end 901 and the terminal receiving end 902 support the 60 GHz communication at the same time and are located in the same subnet, when the transmitting end 901 requests to establish a link of a band supported by both the transmitting end 901 and the receiving end 902 through a link establishment request, because the communication bands of the transmitting end 901 and the receiving end 902 are compatible, the coordinating device 903 instructs the receiving end 902 and the transmitting end 901 to establish a 60 GHz point-to-point connection.

Figure 10:
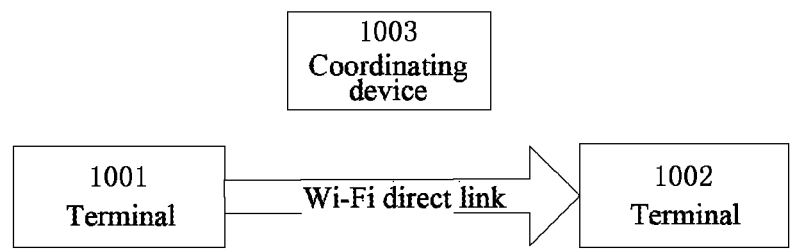

In the application example 2, as shown in FIG. 10, if both the terminal transmitting end 1001 and the terminal receiving end 1002 support the WiFi communication and have the point-to-point link establishment capability, no matter whether they are in the same subnet, when the transmitting end 1001 requests to establish a link of the band supported by both the transmitting end 1001 and the receiving end 1002 through a link establishment request, because the communication bands of the transmitting end 1001 and the receiving end 1002 are compatible, the coordinating device 1003 instructs the receiving end 1002 and the transmitting end 1001 to establish a WiFi point-to-point connection.

In the application example 2, if both the transmitting end and the receiving end of the terminal support the WiFi communication, at least one end does not have the point-to-point link establishment capability and both the transmitting end and the receiving end are located in the same subnet, when the transmitting end requests to establish a link of a band supported by both the transmitting and receiving ends through the link establishment request, because the communication bands of the transmitting end and the receiving end are compatible but at least one end does not have the point-to-point link establishment capability, the coordinating device establishes relay links with the transmitting end and the receiving end, wherein it establishes WiFi relay links with the terminal transmitting end and the terminal receiving end respectively. In this situation, although the coordinating device also serves as a relay node, because the bands of its forward and back relay links are compatible, the coordinating device does not need convert the received data packets.

APPLICATION EXAMPLE 3

Figure 11:
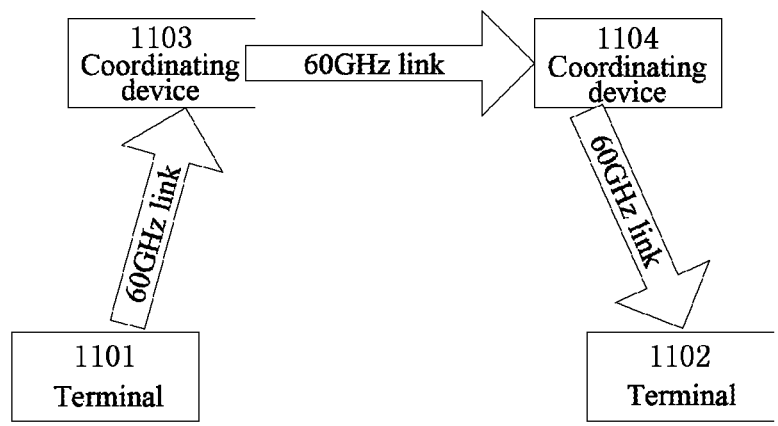

The terminal transmitting and receiving ends in this application example only support the 60 GHz communication, but the transmitting end and the receiving end are located in different subnets. As shown in FIG. 11, the link establishment request of the terminal transmitting end 1101 is sent to the coordinating device 1103 in the subnet where it is located, because both the terminal transmitting and receiving ends support the 60 GHz communication, the request is sent to the coordinating device 1104 in the subnet where the receiving end 1102 is located, and eventually a complete communication link is established.

The terminal transmitting end 1101 sends a link establishment request to the coordinating device 1103 in the subnet where it is located, and the request comprises the terminal information of the terminal transmitting and receiving ends as well as the required communication mode;

the coordinating device 1103 judges the band compatibility;

When the terminal receiving end 1102 supports the 60 GHz communication and it is cross-subnet, the coordinating device 1103 forwards the link establishment request to the coordinating device 1104 according to the local node resource information table;

the coordinating device 1103 establishes a 60 GHz relay link with the terminal transmitting end 1101, and establishes a 60 GHz relay link with the coordination device 1104, the coordinating device 1104 establishes a 60 GHz relay link with the terminal receiving end 1102.

It should be noted that the embodiment of the present document is not limited to that only the coordinating device has the relay function, if a certain terminal has the relay function, it can also be used as a relay node, and the information such as service status and service type of a node can also be added into the node resource information table to provide a reference for route calculation. In addition, the relay node in the embodiment of the present document is not limited to playing the role of transit so as to meet the communications band compatibility, for example, when the point-to-point link is blocked, the relay node can be used as a transit node to establish a relay link; when the WiFi Direct link is not supported between the compatible WiFi terminals, the relay node can also act as a router. For simplicity, the embodiment of the present document does not discuss those embodiments.

It is worth noting that, after all of the above communication links are established, the terminal may request the coordinating device for replacing the communication link in the communication process when the transmission quality deteriorates. For example, when the LOS link quality deteriorates, the coordinating device can coordinate to switch the LOS link to the relay link.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The present document is not limited to the embodiments described above, for specific circumstances, various modifications may be implemented on the embodiments of the present document, and any changes, equivalent replacements, and improvements made thereon should not depart from the protection scope of the appended claims of the present document.

INDUSTRIAL APPLICABILITY

Multi-band mixed networking can be implemented through coordinating devices in the embodiment of the present document.

What is claimed is:

1. A multi-band wireless communication method, applied to a coordinating device that supports multi-band communication, wherein, the coordinating device manages a node resource information table, and the node resource information table comprises terminal information of a subnet where the coordinating device is located and other subnets; the method comprises:

the coordinating device receiving a link establishment request;

the coordinating device responding to the link establishment request based on the resource information table, instructing a transmitting end and a receiving end to establish a point-to-point connection or coordinating to establish relay links between the transmitting end and the receiving end; and when the coordinating device is a relay node, the coordinating device receiving and forwarding received data packets;

wherein the terminal information comprises band information supported by the terminal;

the link establishment request comprises requested band information;

the coordinating device supports two bands: WiFi and 60 GHz;

when the requested band information is 60 GHz, the coordinating device responding to the link establishment request based on the node resource information table comprises:

the coordinating device judging compatibility between the band information supported by the receiving end and the requested band information based on the node resource information table;

if not compatible, the coordinating device establishing a first relay link to the transmitting end and a second relay link to the receiving end;

if compatible, the coordinating device judging whether the transmitting end and the receiving end are located in a same subnet;

if located in the same subnet, the coordinating device instructing the transmitting end and the receiving end to establish a point-to-point connection; if located in different subnets, the coordinating device in the subnet where the transmitting end is located forwarding the link establishment request to the coordinating device in the subnet where the receiving end is located, and the coordinating device in the subnet where the transmitting end is located establishing a first relay link to the transmitting end, the coordinating device in the subnet where the receiving end is located establishing a second relay link to the receiving end, and the coordinating device in the subnet where the transmitting end is located establishing a third relay link to the coordinating device in the subnet where the receiving end is located.

2. The method of claim 1, wherein, the terminal information further comprises identification information used for identifying a terminal and a subnet where the terminal is located;

the link establishment request further comprises identification information of the transmitting end and identification information of the receiving end;

the coordinating device responding to the link establishment request comprises:

if the transmitting end is located in the subnet where the transmitting end is located or the link establishment request comes from a coordinating device in the subnet where the transmitting end is located, the coordinating device responding to the link establishment request.

3. The method of claim 1, wherein, the relay links that the coordinating device coordinates to establish between the transmitting end and the receiving end comprise:

a forward relay link from the coordinating device to the transmitting end as well as a backward relay link from the coordinating device to the receiving end; or, a forward relay link from the coordinating device to the transmitting end as well as a backward relay link from the coordinating device to a coordinating device connecting with the receiving end; or, a forward relay link from the coordinating device to a coordinating device connecting with the transmitting end as well as a backward relay link from the coordinating device to the receiving end.

4. The method of claim 3, wherein, the coordinating device receiving and forwarding received data packets comprises:

when bands of the forward relay link and the backward relay link of the coordinating device are different, the coordinating device converting and then forwarding the received data packets.

5. The method of claim 1, wherein, the terminal information further comprises band information supported by the terminal;

the link establishment request further comprises requested band information;

the coordinating device receiving and forwarding received data packets comprises:

when the requested band information is not compatible with band information supported by the receiving end, the coordinating device in the subnet where the transmitting end is located or the coordinating device in the subnet where the receiving end is located converting and then forwarding the received data packets.

6. The method of claim 1, further comprising:;

when the requested band information is WiFi, the coordinating device responding to the link establishment request based on the node resource information table comprises:

the coordinating device judging compatibility between the band information supported by the receiving end and the requested band information based on the node resource information table;

if compatible, the coordinating device establishing a first relay link to the transmitting end and a second relay link to the receiving end, or instructing the transmitting end and the receiving end to establish a point-to-point connection;

if not compatible, judging whether the transmitting end and the receiving end are located in a same subnet;

if located in the same subnet, the coordinating device establishing a first relay link to the transmitting end and a second relay link to the receiving end; if located in different subnets, the coordinating device in the subnet where the transmitting end is located forwarding the link establishment request to the coordinating device in the subnet where the receiving end is located, and the coordinating device in the subnet where the receiving end is located establishing a first relay link to the transmitting end as well a second relay link to the receiving end.

7. The method of claim 6, wherein, the terminal information further comprises point-to-point capability information;

the coordinating device instructing the transmitting end and the receiving end to establish a point-to-point connection comprises:

when the band information supported by the receiving end is compatible with the requested band information and both the transmitting end and the receiving end have the point-to-point capability, the coordinating device instructing the transmitting end and the receiving end to establish the point-to-point connection.

8. A coordinating device that supports multi-band communication, comprising:

an information managing unit, which is configured to: manage a node resource information table, wherein the node resource information table comprises terminal information of a subnet where the coordinating device is located as well as other subnets;

a request receiving unit, configured to: receive a link establishment request;

a request responding unit, configured to: respond to the link establishment request based on the resource information table, instruct a transmitting end and a receiving end to establish a point-to-point connection or coordinate to establish relay links between the transmitting end and the receiving end; and a packet forwarding unit, configured to: when the coordinating device is a relay node, receive and forward received data packets;

wherein the terminal information comprises band information supported by the terminal;

the link establishment request comprises requested band information;

the coordinating device supports two bands: WiFi and 60 GHz;
the request responding unit comprises:
a compatibility judging unit, configured to: judge compatibility between the band information supported by the receiving end and the requested band information based on the node resource information table:
a cross-subnet judging unit, configured to: when the requested band information is 60 GHz and when judged as compatible, judge whether the transmitting end and the receiving end are located in a same subnet;
a request forwarding unit, configured to: when the coordinating device works as a coordinating device in the subnet where the transmitting end is located and the requested band information is 60 GHz and when judged as cross-subnet, forward the link establishment request to the coordinating device in the subnet where the receiving end is located; and
a link establishing unit, configured to: instruct the transmitting end and the receiving end to establish a point-to-point connection or relay links;
wherein, the link establishing unit is configured to instruct the transmitting end and the receiving end to establish a point-to-point connection or relay links by means of:
when the requested band information is 60 GHz and when judged as not compatible, establishing a first relay link to the transmitting end and a second relay link to the receiving end;
when the requested band information is 60 GHz and when judged as being in the same subnet, instructing the transmitting end and the receiving end to establish a point-to-point connection;
when the requested band information is 60 GHz and when judged as cross-subnet, if the coordinating device works as a coordinating device in the subnet where the transmitting end is located, establishing a first relay link to the transmitting end as well as a third relay link to the coordinating device in the subnet where the receiving end is located; if the coordinating device works as a coordinating device in the subnet where the receiving end is located, establishing a second relay link to the receiving end and a third relay link to the coordinating device in the subnet where the transmitting end is located.

9. The coordinating device of claim 8, wherein,
the terminal information comprises identification information used for identifying a terminal and a subnet where the terminal is located;
the link establishment request comprises identification information of the transmitting end and identification information of the receiving end;
the request responding unit is configured to respond to the link establishment request by means of:
if the transmitting end is located in the subnet where the transmitting end is located or the link establishment request comes from a coordinating device in the subnet where the transmitting end is located, responding to the link establishment request.

10. The coordinating device of claim 8, wherein,
the relay links that the request responding unit coordinates to establish between the transmitting end and the receiving end comprise:
a forward relay link from the coordinating device to the transmitting end as well as a backward relay link from the coordinating device to the receiving end; or,
a forward relay link from the coordinating device to the transmitting end as well as a backward relay link from the coordinating device to a coordinating device connecting with the receiving end; or,
a forward relay link from the coordinating device to a coordinating device connecting with the transmitting end as well as a backward relay link from the coordinating device to the receiving end.

11. The coordinating device of claim 10, wherein,
the packet forwarding unit is configured to receive and forward the received data packets by means of:
when bands of the forward relay link and the backward relay link of the coordinating device are different, converting and then forwarding the received data packets.

12. The coordinating device of claim 8, wherein,
the terminal information further comprises band information supported by the terminal;
the link establishment request further comprises requested band information;
the packet forwarding unit is configured to receive and forward the received data packets by means of:
when the requested band information is not compatible with band information supported by the receiving end, and the coordinating device works as a coordinating device in the subnet where the transmitting end is located or a coordinating device in the subnet where the receiving end is located, converting and then forwarding the received data packets.

13. The coordinating device of claim 8, wherein,
the cross-subnet judging unit is further configured to: when the requested band information is WiFi and when judged as not compatible, judge whether the transmitting end and the receiving end are located in a same subnet;
a request forwarding unit is further configured to: when the coordinating device works as a coordinating device in the subnet where the transmitting end is located and when the requested band information is WiFi and when judged as cross-subnet, forward the link establishment request to the coordinating device in the subnet where the receiving end is located; and;
wherein, the link establishing unit is further configured to instruct the transmitting end and the receiving end to establish a point-to-point connection or relay links by means of:
when the requested band information is WiFi and when judged as compatible, or when the requested band information is WiFi and when judged as being in the same subnet, establishing a first relay link to the transmitting end and a second relay link to the receiving end;
when the requested band information is WiFi and when judged as compatible, instructing the transmitting end and the receiving end to establish a point-to-point connection;
when the requested band information is WiFi and when judged as cross-subnet, if the coordinating device works as a coordinating device in the subnet where the receiving end is located, establishing a first relay link to the transmitting end as well as a second relay link to the receiving end.

14. The coordinating device of claim 13, wherein,
the terminal information further comprises point-to-point capability information;
the link establishing unit is configured to instruct the transmitting end and the receiving end to establish a point-to-point connection by means of:

when the band information supported by the receiving end is compatible with the requested band information and both the transmitting end and the receiving end have the point-to-point capability, instructing the transmitting end and the receiving end to establish the point-to-point connection.

15. A multi-band wireless communication network, comprising at least two subnets, wherein each subnet comprises:
   a coordinating device; and
   at least two terminals, wherein, each of the terminals supports communication in at least one band;
   wherein the coordinating device that supports multi-band communication comprises:
   an information managing unit, which is configured to: manage a node resource information table, wherein the node resource information table comprises terminal information of a subnet where the coordinating device is located as well as other subnets;
   a request receiving unit, configured to: receive a link establishment request;
   a request responding unit, configured to: respond to the link establishment request based on the resource information table, instruct a transmitting end and a receiving end to establish a point-to-point connection or coordinate to establish relay links between the transmitting end and the receiving end; and
   a packet forwarding unit, configured to: when the coordinating device is a relay node, receive and forward received data packets;
   wherein the terminal information comprises hand information supported by the terminal;
   the link establishment request comprises requested band information;
   the coordinating device supports two bands: WiFi and 60 GHz;
   the request responding unit comprises:
   a compatibility judging unit, configured to: judge compatibility between the band information supported by the receiving end and the requested band information based on the node resource information table;
   a cross-subnet judging unit, configured to: when the requested band information is 60 GHz and when judged as compatible, judge whether the transmitting end and the receiving end are located in a same subnet;
   a request forwarding unit, configured to: when the coordinating device works as a coordinating device in the subnet where the transmitting end is located and the requested band information is 60 GHz and when judged as cross-subnet, forward the link establishment request to the coordinating device in the subnet where the receiving end is located; and
   a link establishing unit, configured to: instruct the transmitting end and the receiving end to establish a point-to-point connection or relay links;
   wherein, the link establishing unit is configured to instruct the transmitting end and the receiving end to establish a point-to-point connection or relay links by means of:
   when the requested band information is 60 GHz and when judged as not compatible, establishing a first relay link to the transmitting end and a second relay link to the receiving end;
   when the requested band information is 60 GHz and when judged as being in the same subnet, instructing the transmitting end and the receiving end to establish a point-to-point connection;
   when the requested band information is 60 GHz and when judged as cross-subnet, if the coordinating device works as a coordinating device in the subnet where the transmitting end is located, establishing a first relay link to the transmitting end as well as a third relay link to the coordinating device in the subnet where the receiving end is located; if the coordinating device works as a coordinating device in the subnet where the receiving end is located, establishing a second relay link to the receiving end and a third relay link to the coordinating device in the subnet where the transmitting end is located.

* * * * *